United States Patent [19]

Pichard et al.

[11] Patent Number: 5,762,725

[45] Date of Patent: Jun. 9, 1998

[54] STEEL FOR THE MANUFACTURE OF FORGING HAVING A BAINITIC STRUCTURE AND PROCESS FOR MANUFACTURING A FORGING

[75] Inventors: Claude Pichard, Malancourt La Montagne; Jacques Bellus, Scy-Chazelles; Gilles Pierson, Villers La Montagne, all of France

[73] Assignee: Ascometal, Puteaux, France

[21] Appl. No.: 757,283

[22] Filed: Nov. 27, 1996

[30] Foreign Application Priority Data

Nov. 27, 1995 [FR] France ................... 95 14036

[51] Int. Cl.⁶ .................. C22C 38/22; C22C 38/28; C21D 8/00
[52] U.S. Cl. .................. 148/334; 420/106; 148/649; 148/654
[58] Field of Search ............... 420/106, 110, 420/109; 148/649, 654, 334, 335

[56] References Cited

FOREIGN PATENT DOCUMENTS

| | | |
|---|---|---|
| A-193 914 | 12/1957 | Austria. |
| A-0 191 873 | 8/1986 | European Pat. Off.. |
| 57-63628 | 4/1982 | Japan ................... 148/649 |
| 2 186 594 | 8/1997 | United Kingdom. |

*Primary Examiner*—Deborah Yee
*Attorney, Agent, or Firm*—Oblon, Spivak, McClelland, Maier & Neustadt, P.C.

[57] ABSTRACT

Steel for the manufacture of forgings having a bainitic structure and the mechanical properties of which are: $R_{p0.2} \geq 800$ MPa, $R_m \geq 1000$ MPa, $K_{cu} \geq 50$ J/cm² its chemical composition comprising, by weight: $0.05\% \leq C \leq 0.12\%$, $0.1\% \leq Si \leq 0.45\%$, $1.01\% \leq Mn \leq 1.8\%$, $0.15\% \leq Cr \leq 1.15\%$, $0.06\% \leq Mo \leq 0.12\%$, $Cu \leq 0.30\%$, $Ni \leq 0.30\%$, $0.01\% \leq Ti \leq 0.04\%$, $0.005\% \leq Al \leq 0.04\%$, $0.006\% \leq N \leq 0.013\%$, $0.0005\% \leq B \leq 0.004\%$, $P \leq 0.025\%$, $0.02\% \leq S \leq 0.1\%$, $0\% \leq Pb \leq 0.1\%$, $0\% \leq Te \leq 0.07\%$, optionally from 0.0002% to 0.002% of calcium, the balance being iron and impurities resulting from the smelting, the chemical composition furthermore satisfying the relationship: $0.2\% \leq Ni+Mo+Cu \leq 0.7\%$, the uncombined boron content not being less than 0.0005% above 950° C. Process for the manufacture of a forging.

5 Claims, No Drawings

STEEL FOR THE MANUFACTURE OF FORGING HAVING A BAINITIC STRUCTURE AND PROCESS FOR MANUFACTURING A FORGING

FIELD OF THE INVENTION

The present invention relates to a steel for the manufacture of forgings made of steel having a bainitic structure and very good mechanical properties.

Many mechanical forgings, especially forgings for the motor-vehicle industry, are manufactured by the hot forging of steel billets obtained, for example, by the cold shearing of bars or slabs. After forging, the forgings are cooled in a controlled manner down to room temperature in order to give them the desired mechanical properties without a subsequent heat treatment being necessary.

PRIOR ART

In order to manufacture such forgings, it has been proposed, especially in Patent EP 0,191,873, to use a steel whose chemical composition comprises, by weight, from 0.04% to 0.14% of carbon, from 0.56% to 0.99% of manganese, from 0.05% to 0.5% of silicon, from 1.01% to 2% of chromium, up to 0.5% of titanium, up to 0.1% of aluminum, up to 0.015% of boron and up to 0.15% of sulfur, the balance being iron. After forging, the forgings are water-quenched.

This technique has several drawbacks because, on the one hand, the castability of the steel is not very good, especially in continuous casting, which makes it difficult to manufacture the slabs, and, on the other hand, the internal soundness of the semifinished products is sometimes poor, in particular when the steel is resulfurized in order to improve its machinability. In addition, the tensile strength obtained is sometimes not high enough. For example, too low a carbon content does not ensure hardenability sufficient to obtain the desired tensile mechanical properties. In addition, too low a manganese content leads to tensile mechanical properties which are not good enough: a steel containing 0.05% of carbon, 0.8% of manganese, 1.1% of chromium, boron, aluminum and titanium does not enable $r_{p0.2}$ to exceed 690 MPa nor $R_m$ to exceed 830 MPa. For all these reasons, the reliability of the forgings produced from this steel is not satisfactory.

SUMMARY OF THE INVENTION

The object of the present invention is to remedy these drawbacks by proposing a steel and a process for manufacturing forgings making it possible to obtain good reliability of the forgings produced, having high tensile and toughness properties.

The subject of the invention is therefore a steel for the manufacturing of forgings having a bainitic structure and the mechanical properties of which are, at 20° C.:

$R_{p0.2} \geq 800$ MPa $R_m \geq 1000$ MPa $K_{CU} \geq 50$ J/cm$^2$

The chemical composition comprising, by weight:

$0.05\% \leq C \leq 0.12\%$ $0.1\% \leq Si \leq 0.45\%$ $1.01\% \leq Mn \leq 1.8\%$ $0.15\% \leq Cr \leq 1.15\%$ $0.06\% \leq Mo \leq 0.12\%$ $Cu \leq 0.30\%$ $Ni \leq 0.30\%$ $0.01\% \leq Ti \leq 0.04\%$ $0.005\% \leq Al \leq 0.04\%$ $0.006\% \leq N \leq 0.013\%$ $0.0005\% \leq B \leq 0.004\%$ $P \geq 0.025\%$ $0.02\% \leq S \leq 0.1\%$ $0\% \leq Pb \leq 0.1\%$ $0\% \leq Te \leq 0.07\%$ optionally from 0.0002% to 0.002% of calcium, the balance being iron and impurities resulting from the smelting, the chemical composition furthermore satisfying the relationship:

$0.2\% \leq Ni+Mo+Cu \geq 0.7\%$ the uncombined boron content not being less than 0.0005% above 950° C.

Preferably, the chemical composition of steel is such that:

$0.05\% \leq C \leq 0.08\%$ $0.15\% \leq Si \leq 0.35\%$ $1.01\% \leq Mn \leq 1.35\%$ $0.8\% \leq Cr \leq 1.15\%$ $0.08\% \leq Mo \leq 0.11\%$ The invention also relates to a process for manufacturing a forging, in which:

a billet, made of a steel in accordance with the invention, is taken, the billet is heated to a reheat temperature $T_1$ of between 1000° C. and 1320° C. and forged, the forging terminating at a temperature $T_2$, the reheat temperature $T_1$, being chosen so that, at the temperature $T_2$, the uncombined boron content $B_{uc}$ is greater than or equal to 0.0005%, and directly after forging, the forging is cooled down to room temperature in such a way that the average rate of cooling between the temperature $T_2$ and 100° C. is greater than 14° C./s and preferably less than 250°C./s.

Finally, the invention relates to a forging consisting of a steel in accordance with the invention, having a bainitic structure, and the mechanical properties of which are, at 20° C.:

$R_{p0.2} \geq 800$ MPa $R_m \geq 1000$ MPa $K_{CU} \geq 50$ J/cm$^2$

Preferably, the forging has an equivalent diameter of less than or equal to 55 mm.

DESCRIPTION OF THE PREFERRED EMBODIMENTS

The invention will now be described more completely, but in a non-limiting manner.

In order to manufacture forgings having a bainitic structure, the equivalent diameter of which is preferably less than 55 mm, a steel is used whose chemical composition comprises, by weight:

from 0.05% to 0.012%, and preferably from 0.05% to 0.08%, of carbon in order to obtain a low-carbon bainitic structure having the required tensile and toughness mechanical properties;

from 0.1% to 0.45%, and preferably from 0.15% to 0.35%, of silicon in order to obtain sufficient deoxidation without excessively hardening the ferrite in the as-rolled state;

from 1.01% to 1.8%, and preferably from 1.01% to 1.35%, of manganese in order to obtain good castability and good internal soundness, especially when sulfur is added in order to improve the machinability, and in order to increase the hardenability;

from 0.15% to 1.15%, and preferably 0.8% to 1.15%, of chromium in order to increase the hardenability without excessively hardening the ferrite in the as-rolled state so as not to impair its ability to be cold-sheared;

from 0.06% to 0.12%, and preferably from 0.08% to 0.11%, of molybdenum in order to improve the hardenability synergistically with the boron, less than 0.3% of nickel and less than 0.3% of copper; the sum of the nickel, copper and molybdenum contents must be greater than 0.2% in order to obtain sufficient hardenability, and less than 0.7% in order to avoid formation of martensite after the forging operation;

from 0.01% to 0.04% of titanium, from 0.005% to 0.04% of aluminum, from 0.006% to 0.013% of nitrogen and from 0.0005% to 0.004% of boron in order to obtain, in combination with the other hardening elements, the required hardenability;

less than 0.025% of phosphorus in order not to impair the toughness;

from 0.02% to 0.1% of sulfur, optionally up to 0.07% of tellurium, optionally up to 0.1% of lead and optionally between 0.0002% and 0.002% of calcium in order to obtain good machinability; the balance being iron and impurities resulting from the smelting.

In order to obtain the full effect of the boron on the hardenability, the boron, titanium, aluminum and nitrogen contents are adjusted in such a way that the uncombined boron content $B_{uc}$, is greater than 0.0005% as soon as the temperature T is greater than or equal to 950° C.

The uncombined boron content may be calculated from the temperature T, expressed in °C., and from the titanium, aluminum, boron and nitrogen contents, which are expressed in % by weight, by the following formula:

$$B_{uc} = 10.5 \times 10^{-13970/(T+273)}/A$$

where:

$A = -(0.29 \times Ti + 1.27 \times B + 0.52 \times Al - N) + A \Delta$ and in this formula $\Delta$ is such that:

$\Delta^2 = 0.29 \times Ti + 1.27 \times B + 0.52 \times Al - N + 1.16 \times K_{Ti} + 5.08 \times K_B + 2.08 \times K_{Al}$ where:

$K_{Ti} = 4.73 \times 10^{-16210/(T+273)}$
$K_B = 5.24 \times 10^{-13910/(T+273)}$
$K_{Al} = 0.725 \times 10^{-6180/(T+273)}$ The liquid steel is smelted by vacuum refining in a heated ladle or by refining in a heated ladle followed by a vacuum treatment, and then cast either into the form of slabs, by continuous casting, or into ingots. When the steel is cast into ingots, the ingots are hot rolled into the form of slabs or rounds which are left to cool in still air. When the steel is continuously cast, the continuous-casting blooms are hot rolled also into the form of slabs or rounds.

The slabs or rounds are cropped, by cold shearing, in order to obtain billets which will be hot forged.

In order to manufacture a forging, a billet is heated to a temperature $T_1$, of between 1000° C. and 1320° C. in order to obtain a homogenous austenitic structure, the forging operation is then carried out, this terminating at a temperature $T_2$, and the forging is cooled down to room temperature at an average rate of cooling between $T_2$ and 100 C. of greater than 14° C./s and preferably of less than 250° C./s. The temperature $T_1$ must be chosen in such a way that, given the forging conditions, the final forging temperature $T_2$ is such that, at the end of forging, the uncombined boron content, $B_{uc}$, is greater than 0.0005%.

The uncombined boron content may be calculated from the temperature $T_1$, and from the titanium, aluminum, boron and nitrogen contents using the formula indicated hereinabove.

Thus, in particular for forgings whose equivalent diameter is less than 55 mm, a bainitic structure is obtained throughout the material, the mechanical properties of which are, at 20° C.:

$R_{p0.2} \geq 800$ MPa $R_m \geq 1000$ MPa $K_{CU} \geq 50$ J/cm$^2$

The equivalent diameter of a forging is the diameter of a round, the core cooling rate of which is equal to the cooling rate of the forging during the cooling of the latter after the forging operation.

Depending on the equivalent diameter of the forging, the cooling after the forging operation may be carried out in blown air, in fog, in oil or in water, or by any other means enabling the prescribed cooling conditions to be satisfied.

By way of example, a mechanical shaft was manufactured having a cylindrical general shape, the equivalent diameter of which was 30 mm. In order to manufacture this shaft, a steel vacuum-smelted in a heated ladle was used, the chemical composition, by weight, of which was:

C=0.08%
Si=0.40%
Mn=1.30%
Cr=0.92%
Mo=0.1%
Cu=0.22%
Ni=0.095%
Ti=0.023%
Al=0.032%
N=0.0075%
B=0.0028%
P=0.015%
S=0.072% the balance being iron and impurities resulting from the smelting.

Before forging, the billets were heated to a temperature of 1280° C. and forged in order to manufacture shafts whose equivalent diameter was 30 mm. The final forging temperature was 1050° C. At this temperature, the uncombined boron content of the steel was 0.0021%. After forging, the shafts were cooled in 20° C. water with stirring, which resulted in an average rate of cooling to the core 36° C./s between 1050° C. and 100° C. and gave a bainitic structure whose mechanical properties at 20° C. were:

$R_{p0.2}$=896 MPa $R_m$=1116 MPa $K_{CU}$=84 J/cm$^2$

The steel was cast without any difficulty and the semi-finished products exhibited no internal soundness defects, despite a high sulfur content added in order to obtain good machinability.

We claim:

1. A steel for the manufacture of forgings having a bainitic structure throughout and the mechanical properties of which are, at 20° C.:

$R_{p0.2} \geq 800$ MPa $R_m \geq 1000$ MPa $K_{CU} \geq 50$ J/cm² whose chemical composition comprises, by weight:

$0.05\% \leq C \leq 0.12\%$ $0.1\% \leq Si \leq 0.45\%$ $1.01\% \leq Mn \leq 1.8\%$ $0.15\% \leq Cr \leq 1.15\%$ $0.06\% \leq Mo \leq 0.12\%$ $Cu \leq 0.30\%$ $Ni \leq 0.30\%$ $0.01\% \leq Ti \leq 0.04\%$ $0.005\% \leq Al \leq 0.04\%$ $0.006\% \leq N \leq 0.013\%$ $0.0005\% \leq B \leq 0.004\%$ $P \leq 0.025\%$ $0.02\% \leq S \leq 0.1\%$ $0\% \leq Pb \leq 0.1\%$ $0\% \leq Te \leq 0.07\%$ optionally from 0.0002% to 0.002% of calcium, the balance being iron and impurities resulting from the smelting, the chemical composition furthermore satisfying the relationship:

$0.2\% \leq Ni+Mo+Cu \leq 0.7\%$ the uncombined boron content not being less than 0.0005% above 950° C.

2. The steel as claimed in claim 1, whose chemical composition is such that:

$0.05\% \leq C \leq 0.08\%$ $0.15\% \leq Si \leq 0.35\%$ $1.01\% \leq Mn \leq 1.35\%$ $0.8\% \leq Cr \leq 1.15\%$ $0.08\% \leq Mo \leq 0.11\%$ 3. A process for manufacturing a forging, wherein:

a billet, made of a steel in accordance with claim 1 or with claim 2, is taken, the billet is heated to a reheat temperature $T_1$, of between 1000° C. and 1320° C. and forged, the forging terminating at a temperature $T_2$, the reheat temperature $T_1$ being chosen so that, at the temperature $T_2$, the uncombined boron content $B_{uc}$ is greater than or equal to 0.0005%, and directly after forging, the forging is cooled down to room temperature in such a way that, at all points in the forging, the average rate of cooling between the temperature $T_2$ and 100° C. is greater than 14° C./s and less than 250° C./s.

4. A forging which consists of a steel as claimed in claim 1 or claim 2, which has a bainitic structure throughout and whose mechanical properties are, at 20° C.:

$R_{p0.2} \geq 800$ MPa $R_m \geq 1000$ MPa $K_{CU} \geq 50$ J/cm²

5. A forging as claimed in claim 4, whose equivalent diameter is less than or equal to 55 mm.

* * * * *